(12) United States Patent
Anand et al.

(10) Patent No.: US 8,943,838 B2
(45) Date of Patent: Feb. 3, 2015

(54) INTEGRATED TURBOMACHINE PLANT

(75) Inventors: Ashok Kumar Anand, Niskayuna, NY (US); John Edward Sholes, Kings Mountain, NC (US); Veerapan Muthaiah, Karnataka (IN)

(73) Assignee: General Electric Company, Schenectady, NY (US)

( * ) Notice: Subject to any disclaimer, the term of this patent is extended or adjusted under 35 U.S.C. 154(b) by 786 days.

(21) Appl. No.: 13/216,939

(22) Filed: Aug. 24, 2011

(65) Prior Publication Data

US 2013/0047629 A1 Feb. 28, 2013

(51) Int. Cl.
*F02C 6/08* (2006.01)
*F02C 6/18* (2006.01)
*F02C 3/28* (2006.01)
*B01D 53/22* (2006.01)

(52) U.S. Cl.
CPC ... *F02C 6/08* (2013.01); *F02C 3/28* (2013.01); *F02C 6/18* (2013.01); *Y02E 20/18* (2013.01); *B01D 53/228* (2013.01); *B01D 2256/12* (2013.01)
USPC .......................................... 60/783; 60/39.511

(58) Field of Classification Search
CPC ............. F02C 6/08; F02C 6/10; F02C 6/18; F02C 3/28; F02C 7/18; B01D 53/228; B01D 2256/12

USPC ........... 60/780, 782, 783, 784, 785, 788, 806, 60/39.5, 39.511, 39.17, 39.464
See application file for complete search history.

(56) References Cited

U.S. PATENT DOCUMENTS

| | | | | |
|---|---|---|---|---|
| 4,545,787 A | * | 10/1985 | Hegarty | 60/783 |
| 5,516,359 A | * | 5/1996 | Kang et al. | 60/39.5 |
| 5,562,754 A | | 10/1996 | Kang et al. | |
| 5,565,017 A | | 10/1996 | Kang et al. | |
| 5,657,624 A | | 8/1997 | Kang et al. | |
| 5,740,673 A | * | 4/1998 | Smith et al. | 60/783 |
| 6,202,442 B1 | | 3/2001 | Brugerolle | |
| 6,276,171 B1 | | 8/2001 | Brugerolle | |
| 6,298,656 B1 | * | 10/2001 | Donovan et al. | 60/806 |
| 7,581,401 B2 | * | 9/2009 | West et al. | 60/806 |
| 2008/0115478 A1 | * | 5/2008 | Sullivan | 60/39.12 |
| 2008/0202123 A1 | | 8/2008 | Sullivan et al. | |
| 2010/0251729 A1 | * | 10/2010 | Gutierrez et al. | 60/781 |

* cited by examiner

*Primary Examiner* — J. Gregory Pickett
(74) *Attorney, Agent, or Firm* — Cantor Colburn LLP

(57) ABSTRACT

An integrated turbomachine plant is provided and includes a combustor a turbomachine operably connected to the combustor and including a compressor and a turbine expander, a pathway to flow compressed air from the compressor through the turbine expander to heat the compressed air, an additional pathway by which high temperature fluids output from the turbomachine are employed to heat the compressed air and an air separation unit operably connected to the pathway and configured to separate the heated compressed air into oxygen and oxygen-depleted air.

18 Claims, 3 Drawing Sheets

INTEGRATED TURBOMACHINE PLANT

BACKGROUND OF THE INVENTION

The subject matter disclosed herein relates generally to gasification power plants. More specifically, the subject disclosure relates to air separation plants for use in power production.

Typical gasification power plants use oxygen to convert a feedstock, for example, coal into a fuel gas for combustion in a gas turbine to produce electrical power via a generator connected thereto. In an integrated gasification power plant, the air from which the oxygen is separated is supplied from the gas turbine compressor thus improving plant efficiency and reducing cost. Air is compressed in the compressor of the gas turbine, and oxygen is produced from the compressed air by separating the oxygen from other constituents of the compressed air in an air separation unit. One type of air separation unit commonly used is a membrane-based air separation unit. In a membrane-based separation unit, air separation occurs at temperatures above about 1400 F, typically in the range of about 1400 F to about 1600 F. Compressed air from the gas turbine compressor, however, is available in the range of about 600 F to about 1000 F. Thus, the compressed air is heated via a heat exchanger or fuel heater to raise the temperature to the necessary 1400 F to 1600 F for utilization in the air separation unit. Utilization of this heat exchanger adds additional cost and requires additional fuel to operate.

BRIEF DESCRIPTION OF THE INVENTION

According to one aspect of the invention, an integrated turbomachine plant is provided and includes a combustor a turbomachine operably connected to the combustor and including a compressor and a turbine expander, a pathway to flow compressed air from the compressor through the turbine expander to heat the compressed air, an additional pathway by which high temperature fluids output from the turbomachine are employed to heat the compressed air and an air separation unit operably connected to the pathway and configured to separate the heated compressed air into oxygen and oxygen-depleted air.

According to another aspect of the invention, an integrated turbomachine plant is provided and includes a combustor, a turbomachine operably connected to the combustor and including a compressor and a turbine expander, first and second pathways to flow compressed air from the compressor through the turbine expander to heat the compressed air, a third pathway to flow compressed air from the first pathway, additional pathways to split high temperature fluids output from an outlet of the turbine expander into first and second portions thereof, the additional pathways being configured to heat at least the second portion and to flow the at least the heated second portion to one of a combination of the first, second and third pathways or to the third pathway to heat the compressed air thereof in turn and an air separation unit operably connected to the first, second and third pathways and configured to separate the heated compressed air into oxygen and oxygen-depleted air.

According to yet another aspect of the invention, a method of operating an integrated turbomachine plant is provided and includes flowing compressed air along a pathway from a compressor through a turbine expander to heat the compressed air, flowing high temperature fluids along an additional pathway from an outlet of the turbine expander, using the high temperature fluids of the additional pathway to heat the compressed air subsequent to the compressed air flowing through the turbine expander and separating the heated compressed air into oxygen and oxygen-depleted air.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
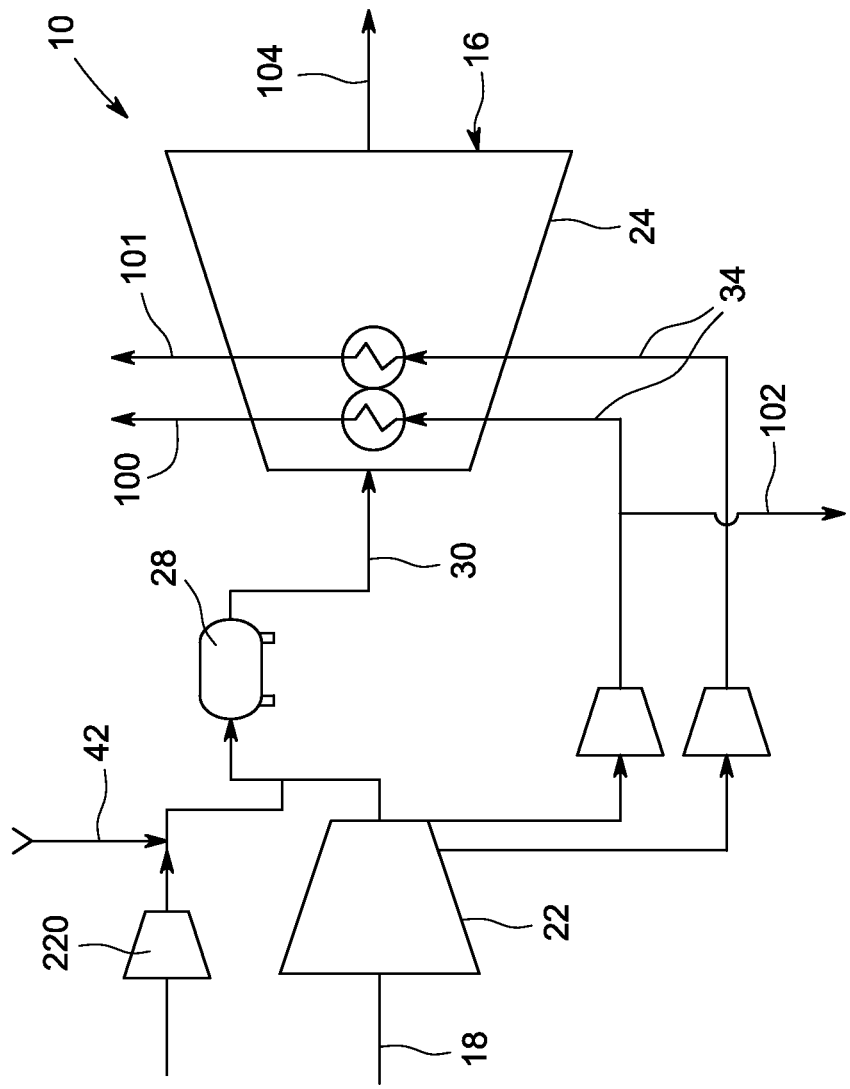
FIG. 1 is a schematic view of an integrated turbomachine plant with a focus on the turbomachine.
Figure 2:
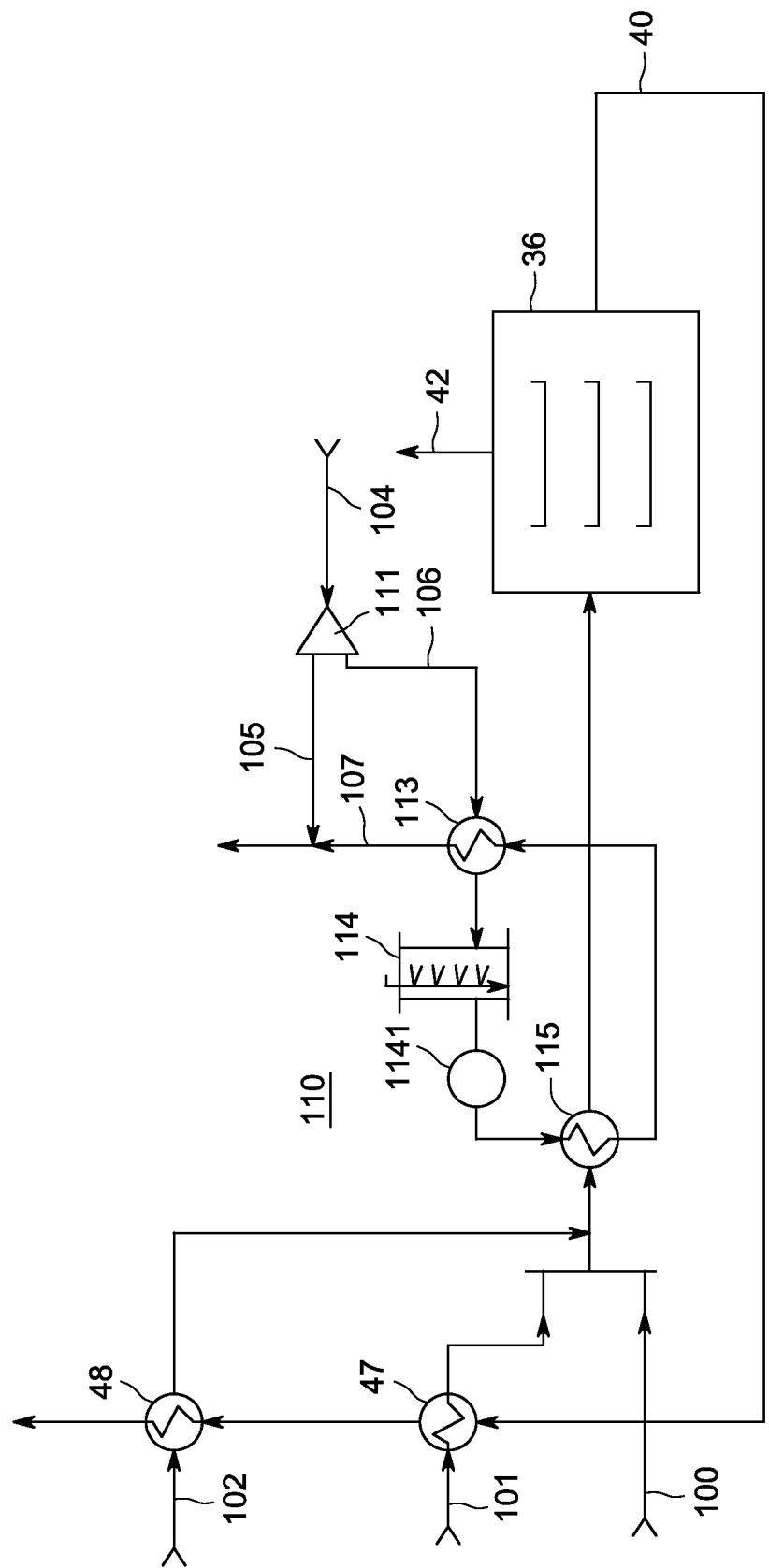
FIG. 2 is a schematic view of an integrated turbomachine plant in accordance with embodiment.

With reference to FIGS. 1 and 2, an integrated turbomachine plant 10 is provided. The plant 10 may include a gasifier, which produces fuel gas from a feedstock such as, for example, coal. The fuel gas is supplied to a combustor 28 operably connected to a turbomachine 16, for example, a gas turbine. The combustor 28 combusts the fuel gas and produces combustion products 30, which drive a turbine shaft of the turbomachine 16 connected to, for example, a generator to produce electrical power. The turbomachine 16 includes a compressor 22 located along the shaft and operably connected to a turbine expander 24. Airflow is input into the compressor 22, compressed and output to the combustor 28 to be combusted with the fuel gas. The combustion products 30 are routed to the turbine expander 24 to drive the shaft 18.

The plant 10 may include an air separation system which separates oxygen from other constituents in the air. A portion of a compressed airflow is diverted from the compressor 22 at a compressor output temperature, typically in the range of about 600 F to 1000 F. The compressed airflow is routed to the turbine expander 24 and/or the combustor 28 via one or more of first and second (i.e. primary) compressed airflow pathways 34 to provide cooling for components therein, which typically operate at a temperature much higher than about 600 F to 1000 F, and further require such cooling for the components to achieve a useful life. The compressed airflow after routing through the turbine expander 24 is now at a temperature of about 1400 F to 1600 F in some embodiments and is routed as base flows 100, 101 to an air separation unit 36 which, in some embodiments, is an ion transport membrane-based and has an operating temperature in the range of about 1400 F to 1600 F, a convenient match for the expander outflow.

If, in some cases the expander outflow is at a temperature less than the operating temperature range of the air separation unit 36, additional heating of the compressed airflow is required and the compressed airflow output from the compressor 22 may be flowed along a third (i.e., secondary) pathway as supplemental flow 102 through a further heat exchange system 110 to increase the temperature of the compressed airflow to within the operating temperature of the air separation unit 36. The supplemental flow 102 may proceed from any one or more stages of the compressor 22 or from either of the one or more of the first and second compressed airflow pathways 34. Where the supplemental flow 102 proceeds from the first compressed airflow pathway 34, the branching off of the supplemental flow 102 may occur between the compressor 22 and the turbine expander 24.

Once the compressed air is flowed to the air separation unit 36, the air separation unit 36 separates the compressed airflow into a flow of low pressure high temperature oxygen 40 and a flow of oxygen-depleted air 42. In some embodiments, the oxygen-depleted air 42 may be flowed to the turbine expander 24 via one or more oxygen-depleted air pathways to drive rotation of the shaft 18 thus increasing efficiency of the turbomachine 16. Further, in some embodiments, at least a portion of the oxygen-depleted air 42 is routed from the air separation unit 36 to the combustor 28 and introduced thereto via one or more combustor pathways. Introduction of the oxygen-depleted air 42 into the combustor 28 to be combusted with the fuel gas increases the efficiency and output of the plant 10 and reduces emissions of, for example, oxides of nitrogen ($NO_x$) from the combustor 28. In some embodiments, prior to introduction into the combustor 28, the oxygen-depleted air 42 is cooled to a desired combustor 28 inlet temperature. In some further embodiments, an auxiliary compressor 220 is connected to the one or more combustor pathways. The auxiliary compressor 220 is utilized to boost the flow through the one or more combustor pathways by introducing additional high-pressure air into the stream of oxygen-depleted air 42 flowing to the combustor 28 to further increase the efficiency and power output of the plant 10.

The flow of high temperature oxygen 40 may be utilized in many different ways. For example, in some embodiments, the high temperature oxygen 40 may be introduced into the gasifier in addition to the feed stock to produce the fuel gas. Depending on the input requirements of the gasifier, the flow of high temperature oxygen 40 may be modified. As another example, the flow of high temperature oxygen 40 may be cooled in heat exchangers 47, 48, such as oxygen recuperators, where heat of the oxygen 40 is respectively exchanged with the base flow 101 and with the supplemental flow 102, which is proceeding to the further heat exchange system 110. Further, if a higher pressure flow of oxygen 40 is desired, the flow of oxygen 40 may be introduced to an oxygen compressor to raise the pressure to a desired level. Other examples of this plant 10 may use conventional gas turbine fuels such as natural gas or oil and the oxygen produced could be exported for use in an industrial plant.

The further heat exchange system 110 heats the supplemental flow 102 for injection thereof into the air separation unit 36 in case the expander outflow is provided at a temperature that is less than the operating temperature range of the air separation unit 36. The further heat exchange system 110 includes additional pathways as will be described below and a splitter 111 that receives as an input a high temperature flow 104, which includes exhaust gases output from the outlet of the turbomachine 16 at a temperature of about 1100 F to 1150 F. The splitter 111 divides the high temperature flow 104 into first and second portions 105 and 106. The splitter 111 may be coupled to a control unit and controlled to modulate relative quantities of the first and second portions 105 and 106.

The first portion 105 proceeds from the splitter 111 to a combining unit where the first portion is combined with other fluid flows. The second portion 106 proceeds from the splitter 111 to first heat exchange unit 113 and heater 114 sequentially. The first heat exchange unit 113 may be, for example, a bootstrap-type heat exchanger in which the second portion 106 is heated to about 1300 F to 1400 F. The heater 114 may be, for example, a duct burner that is provided with a fuel stream and, in some cases, may further include an electric heater 1141 that heats the second portion 106 to about 1500 F to 1600 F. From the heater 114, the second portion 106 proceeds to a second heat exchange unit 115, which may be, for example an exhaust air heat exchanger.

At the second heat exchange unit 115, the second portion 106 is employed to heat a combination of the base flows 100, 101 and the supplemental flow 102 proceeding toward the air separation unit 36. From the second heat exchange unit 115, the second portion 106 proceeds in a loop configuration back to the first heat exchange unit 113, in which the second portion 106 having now been heated is employed to heat the second portion 106. The second portion 106 then proceeds from the first heat exchange unit 113 as further portion 107, which may be combined with first portion 105.

Figure 3:
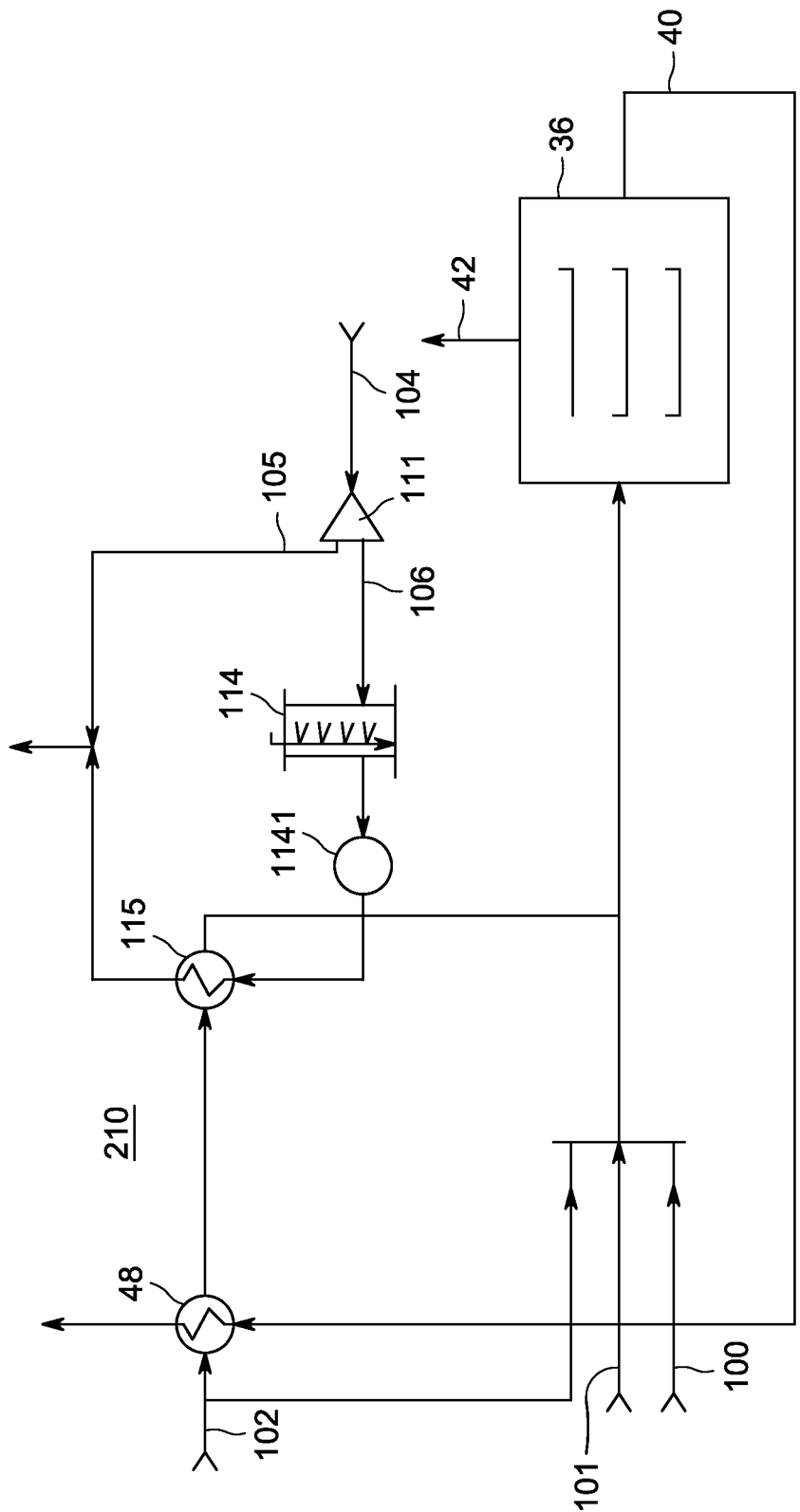
FIG. 3 is a schematic view of an integrated turbomachine plant in accordance with alternate embodiments.

With reference to FIG. 3, an alternate further heat exchange system 210 is provided in accordance with alternate embodiments. The alternate further heat exchange system 210 may be employed for cases where temperatures of base flows 100, 101 exceed the operating temperature range of the air separation unit 36. As shown, supplemental flow 102 is split with a portion flowing to heat exchanger 48 and a remaining portion being combined with the base flows 100, 101 to cool the base flows 100, 101. The alternate further heat exchange system 210 also includes the splitter 111 that receives as an input the high temperature flow 104, as described above. Again, the splitter 111 divides the high temperature flow 104 into first and second portions 105 and 106.

The first portion 105 proceeds from the splitter 111 to a combining unit where the first portion is combined with other fluid flows. The second portion 106 proceeds from the splitter 111 to heater 114 as described above. From the heater 114, the second portion 106 proceeds to the second heat exchange unit 115. At the second heat exchange unit 115, the second portion 106 is employed to heat the portion of the supplemental flow 102 that was directed to and through the heat exchanger 48. The second portion 106 may then be combined with the first portion 105. Meanwhile, the portion of the supplemental flow 102 proceeds from the second heat exchange unit 115 and is combined with the combination of the base flows 100, 101 and the remaining portion of the supplemental flow 102. This combination is then provided to the air separation unit 36 as having a temperature within the operating range of the air separation unit 36.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An integrated turbomachine plant, comprising:
   a combustor;
   a turbomachine operably connected to the combustor and including a compressor and a turbine expander;
   a main pathway to flow compressed air from the compressor through the turbine expander to heat the compressed air;

an additional pathway and a heater disposed along the additional pathway by which high temperature fluids output from the turbomachine are heated by the heater and subsequently employed to heat the compressed air; and an air separation unit operably connected to the main pathway and configured to separate the heated compressed air into oxygen and oxygen-depleted air.

2. The plant according to claim 1, further comprising heat exchangers disposed along the additional pathway whereby heat is transmitted from the high temperature fluids and the oxygen to the compressed air.

3. The plant according to claim 2, wherein one or more of the heat exchangers comprises one or more of an oxygen recuperator, an exhaust air heat exchanger and a boot strap heat exchanger.

4. The plant according to claim 1, wherein the heaters comprises a duct burner.

5. The plant according to claim 1, wherein the air separation unit comprises an ion transport membrane.

6. The plant according to claim 1, further comprising a secondary pathway to flow compressed air from the main pathway or the compressor.

7. The plant according to claim 6, wherein the additional pathway is configured such that the high temperature fluids are employed to heat the compressed air of a combination of the main pathway and the secondary pathway.

8. An integrated turbomachine plant, comprising:
a combustor;
a turbomachine operably connected to the combustor and including a compressor and a turbine expander;
first and second pathways to flow compressed air from the compressor through the turbine expander to heat the compressed air;
a third pathway to flow compressed air from the first pathway;
additional pathways to split high temperature fluids output from an outlet of the turbine expander into first and second portions thereof;
a heater disposed along the additional pathways,
the heater of the additional pathways being configured to heat at least the second portion and the additional pathways being configured to subsequently flow the at least the heated second portion to one of a combination of the first, second and third pathways or to the third pathway to heat the compressed air thereof in turn; and
an air separation unit operably connected to the first, second and third pathways and configured to separate the heated compressed air into oxygen and oxygen-depleted air.

9. The plant according to claim 8, wherein the third pathway is configured to flow the compressed air from a location of the first pathway defined between the compressor and the turbine expander.

10. The plant according to claim 8, wherein:
the additional pathways flow the second portion of the high temperature fluids to the first, second and third pathways when a temperature of the compressed air is below an operating temperature range of the air separation unit.

11. The plant according to claim 8, wherein the first and second portions of the high temperature fluids are combined along the additional pathways.

12. The plant according to claim 8, further comprising heat exchangers disposed along the first, second, third and additional pathways whereby heat is transmitted from the high temperature fluids and the oxygen to the compressed air.

13. The plant according to claim 12, wherein one or more of the heat exchangers comprises one or more of an oxygen recuperator, an exhaust air heat exchanger and a boot strap heat exchanger.

14. The plant according to claim 8, wherein the heater comprises a duct burner.

15. The plant according to claim 8, wherein the air separation unit comprises an ion transport membrane.

16. The plant according to claim 8, wherein the additional pathways flow the second portion of the high temperature fluids to the third pathway when a temperature of the compressed air is above the operating temperature range of the air separation unit.

17. A method of operating an integrated turbomachine oxygen plant, the method comprising:
flowing compressed air along a pathway from a compressor through a turbine expander to heat the compressed air;
flowing high temperature fluids along an additional pathway from an outlet of the turbine expander and heating the high temperature fluids at a heater disposed along the additional pathway;
using the high temperature fluids as heated by the heater of the additional pathway to heat the compressed air subsequent to the compressed air flowing through the turbine expander; and
separating the heated compressed air into oxygen and oxygen-depleted air.

18. The method according to claim 17, wherein the flowing of the high temperature fluids along the additional pathway comprises splitting the high temperature fluids into first and second portions thereof, the second portion being used to heat the compressed air.

* * * * *

UNITED STATES PATENT AND TRADEMARK OFFICE
CERTIFICATE OF CORRECTION

| | | |
|---|---|---|
| PATENT NO. | : 8,943,838 B2 | Page 1 of 1 |
| APPLICATION NO. | : 13/216939 | |
| DATED | : February 3, 2015 | |
| INVENTOR(S) | : Anand et al. | |

It is certified that error appears in the above-identified patent and that said Letters Patent is hereby corrected as shown below:

In the claims,

In Column 5, Line 17, in Claim 4, delete "heaters" and insert -- heater --, therefor.

Signed and Sealed this
First Day of December, 2015

Michelle K. Lee
*Director of the United States Patent and Trademark Office*